United States Patent
Li et al.

(10) Patent No.: US 11,685,496 B2
(45) Date of Patent: Jun. 27, 2023

(54) REACTION DEVICE OF MARINE SCR SYSTEM

(71) Applicant: SHANGHAI MARINE DIESEL ENGINE RESEARCH INSTITUTE, Shanghai (CN)

(72) Inventors: Xiaobo Li, Shanghai (CN); Mingshan Guo, Shanghai (CN); Zhipeng Hou, Shanghai (CN); Xizhao Zhang, Shanghai (CN); Teng Shen, Shanghai (CN); Zhenhua Wang, Shanghai (CN); Wenjie Kong, Shanghai (CN); Yi Lu, Shanghai (CN); Lili Shi, Shanghai (CN); Yuanyuan Huang, Shanghai (CN)

(73) Assignee: SHANGHAI MARINE DIESEL ENGINE RESEARCH INSTITUTE, Shanghai (CN)

( * ) Notice: Subject to any disclaimer, the term of this patent is extended or adjusted under 35 U.S.C. 154(b) by 0 days.

(21) Appl. No.: 17/793,637

(22) PCT Filed: Jan. 19, 2021

(86) PCT No.: PCT/CN2021/072708
§ 371 (c)(1),
(2) Date: Jul. 18, 2022

(87) PCT Pub. No.: WO2021/147859
PCT Pub. Date: Jul. 29, 2021

(65) Prior Publication Data
US 2023/0058467 A1  Feb. 23, 2023

(30) Foreign Application Priority Data
Jan. 21, 2020 (CN) .......................... 202010071737.8

(51) Int. Cl.
*B63H 21/32* (2006.01)
*F01N 3/28* (2006.01)
*F01N 3/20* (2006.01)

(52) U.S. Cl.
CPC ............ *B63H 21/32* (2013.01); *F01N 3/2066* (2013.01); *F01N 3/2892* (2013.01); *F01N 3/208* (2013.01);
(Continued)

(58) Field of Classification Search
CPC combination set(s) only.
See application file for complete search history.

(56) References Cited

U.S. PATENT DOCUMENTS 6,444,177 B1 * 9/2002 Muller ................ B01F 23/2132
422/177
8,938,954 B2 * 1/2015 De Rudder ........... F01N 3/2892
60/323

(Continued)

FOREIGN PATENT DOCUMENTS

| CN | 106121787 A | 11/2016 |
|---|---|---|
| CN | 106237913 A | 12/2016 |

(Continued)

OTHER PUBLICATIONS

International Patent Application No. PCT/CN2021/072708; Int'l Search Report; dated Apr. 15, 2021; 3 pages.

*Primary Examiner* — Binh Q Tran
(74) *Attorney, Agent, or Firm* — BakerHostetler (57) ABSTRACT

A reaction device of a marine SCR system comprises a conveying unit (110), a reaction chamber (120), at least one catalyst module (130), and an air homogenization chamber (140), wherein, the conveying unit (110) includes an input pipeline (111) and an output pipeline (112) sleeved outside the input pipeline (111). One end of the reaction chamber (120) is connected to the conveying unit (110). The reaction chamber (120) comprises an inner cylinder (121) and an outer cylinder (122) sleeved outside the inner cylinder (121), the inner cylinder (121) is in communication with the input pipeline (111), and the outer cylinder (122) is in communi-
(Continued)

cation with the output pipeline (112). The catalyst module (130) is provided between the inner cylinder (121) and the outer cylinder (122). The air homogenization chamber (140) is connected to the other end of the reaction chamber (120) and is in communication with both the inner cylinder (121) and the outer cylinder (122). With the reaction device of the marine SCR system whereby the outer cylinder is sleeved outside the inner cylinder, flue gas from the inner cylinder is turned by the air homogenization chamber and then flows back into the outer cylinder. This can not only substantially reduce the size of the reaction device to improve the integration of the SCR system, but also allow the flue gas to turn in the air homogenization chamber and then flow back, so that the flue gas and a reducing agent can be fully mixed in the air homogenization chamber to improve the catalytic reaction efficiency.

15 Claims, 8 Drawing Sheets

(52) U.S. Cl.
CPC ...... *F01N 2240/20* (2013.01); *F01N 2330/38* (2013.01); *F01N 2570/14* (2013.01); *F01N 2590/02* (2013.01); *F01N 2610/02* (2013.01); *F01N 2610/1453* (2013.01); *F01N 2900/04* (2013.01); *F01N 2900/14* (2013.01)

(56) References Cited

U.S. PATENT DOCUMENTS

| | | | |
|---|---|---|---|
| 8,978,366 B2* | 3/2015 | Brugger | F01N 13/009 60/296 |
| 9,322,309 B2* | 4/2016 | Beyer | F01N 3/20 |
| 10,086,332 B2 | 10/2018 | Zhang | |
| 10,954,841 B2* | 3/2021 | Brinkmeyer | B01F 25/435 |
| 2015/0152767 A1* | 6/2015 | Laurell | F01N 3/2839 60/299 |
| 2016/0326938 A1* | 11/2016 | Zhang | B01F 25/432 |
| 2017/0354934 A1* | 12/2017 | Muruganantham | F01N 3/2066 |

FOREIGN PATENT DOCUMENTS

| | | |
|---|---|---|
| CN | 108487977 A | 9/2018 |
| CN | 109162790 A | 1/2019 |
| CN | 106121787 B | 3/2020 |
| CN | 211777663 U | 10/2020 |
| CN | 109162790 B | 8/2021 |
| DE | 102016108287 A1 | 11/2016 |
| JP | 2015-183633 A | 10/2015 |
| RU | 2016115874 A | 10/2017 |
| RU | 2702619 C2 | 10/2019 |

* cited by examiner

REACTION DEVICE OF MARINE SCR SYSTEM

CROSS-REFERENCE TO RELATED APPLICATIONS

This application is the National Stage of International Patent Application No. PCT/CN2021/072708, filed on Jan. 19, 2021, which claims priority to Chinese Patent Application No. 202010071737.8, filed on Jan. 21, 2020, the disclosures of which are incorporated herein by reference in their entireties.

BACKGROUND

The present invention relates to the technical field of treatment of pollutants discharged by marine diesel engines, and in particular to a reaction device of a marine SCR (Selective Catalytic Reduction) system.

The selective catalytic reduction technology is to inject a reducing agent (e.g., urea solution), into the exhaust gas of a diesel engine to reduce the NOx in the flue gas into $N_2$ and $H_2O$. With high conversion efficiency for NOx and a small impact on performance of diesel engines, this technology has become the most important technical approach to reduce NOx emissions from marine diesel engines.

However, the traditional SCR reactor has direct-flow structures connected in series. Specifically, a mixing pipeline section is disposed downstream of a urea nozzle, and connected to a catalytic reactor. Such features in structure result in a long overall length and large size, making it difficult for its arrangement in the limited space of a cabin.

In addition, the direct-flow mixing pipeline also has the defect of insufficient homogeneity of the mixing. If the length of the mixing pipeline is increased in order to improve a homogeneity of the mixing, the size of the direct-flow reactor will be increased again.

Therefore, there is a need to provide a reaction device of the marine SCR system to at least partially solve the problems existing in the prior art.

SUMMARY

A series of simplified ideas is introduced into the portion of Summary, which would be further illustrated in the portion of the detailed description. The Summary of the present invention does not mean attempting to define the key feature and essential technical feature of the claimed technical solution, let alone determining the protection scope thereof.

In order to at least partially solve the above-mentioned problem, the present invention provides a reaction device of a marine SCR system, comprising:

a conveying unit including an input pipeline and an output pipeline sleeved outside the input pipeline;

a reaction chamber, one end of the reaction chamber is connected to the conveying unit, the reaction chamber including an inner cylinder and an outer cylinder sleeved outside the inner cylinder, and the inner cylinder being in communication with the input pipeline and the outer cylinder being in communication with the output pipeline;

at least one catalyst module arranged between the inner cylinder and the outer cylinder; and an air homogenization chamber connected to the other end of the reaction chamber and being in communication with both the inner cylinder and the outer cylinder.

With the reaction device of the marine SCR system according to the present invention, the outer cylinder is sleeved outside the inner cylinder, and the flue gas flowing from the inner cylinder is turned by the air homogenization chamber and flows back into the outer cylinder. In this way, it is possible to not only substantially reduce the size of the reaction device to contribute to compactness and miniaturization of the reaction device and improve the integration of the SCR system, but also to allow the flue gas to turn in the air homogenization chamber and then flow back, so that the flue gas and a reducing agent can be fully mixed in the air homogenization chamber to improve the catalytic reaction efficiency.

Further, the reaction device further comprises a spray assembly including a sprayer that extends into the input pipeline, wherein a nozzle of the sprayer is oriented towards the reaction chamber.

Further, one end of the output pipeline further away from the reaction chamber is closed, and an exhaust pipeline is provided on a side wall of the output pipeline for exhausting flue gas after reaction.

Further, cross-sections of the inner cylinder and the outer cylinder are square-shaped.

Further, a side of one of the catalyst modules facing the air homogenization chamber is flush with an end face of the inner cylinder closer to the air homogenization chamber.

Further, the reaction device further comprises a deflector arranged in the air homogenization chamber for changing a flow direction of flue gas.

Further, the deflector comprises a backflow ring configured in the shape of a truncated cone, and the top portion of the backflow ring is connected to a wall surface of the air homogenization chamber facing the reaction chamber.

Further, the deflector further comprises:

a guide ring configured in a cone shape, a cone tip of which is arranged towards the reaction chamber, a bottom opening of the guide ring covering a top opening of the backflow ring, and the guide ring spaced apart from the backflow ring; and at least one air homogenization plate connected between the guide ring and the backflow ring in a horizontal direction and/or a vertical direction.

Further, the deflector further comprises at least one air homogenization ring configured in a cone shape, and a top portion of the air homogenization ring is arranged facing away from the reaction chamber and connected to an end of the air homogenization plate further away from the guide ring.

Further, the respective central axes of the guide ring, the backflow ring and the air homogenization chamber coincide.

BRIEF DESCRIPTION OF THE DRAWINGS

The following drawings are hereby incorporated as part of the present invention for the understanding of the present invention. The embodiments are illustrated and described in the drawings in order to explain the principles of the present invention.

In the drawings.

Description of reference signs:

| | |
|---|---|
| 100: Reaction device | 110: Conveying unit |
| 111: Input pipeline | 112: Output pipeline |
| 113: Exhaust pipeline | 120: Reaction chamber |
| 121: Inner cylinder | 122: Outer cylinder |
| 123: Inner flow channel | 124: Outer flow channel |
| 130: Catalyst module | 140: Air homogenization chamber |
| 150: Spray assembly | 151: Sprayer |
| 200: Deflector | 210: Backflow ring |
| 220: Guide ring | 230: Air homogenization plate |
| 240: Air homogenization ring | |

DETAILED DESCRIPTION

In the following description, numerous specific details are set forth in order to provide a more thorough understanding of the present invention. However, it is obvious to those skilled in this art that the present invention can be implemented without one or more of these details. Some technical features well-known in this art are not described in other examples in order to avoid confusion with the present invention.

In order to thoroughly understand the present invention, a detailed description will be provided in the following description. Obviously, the implementation of this invention is not limited to the specific details familiar to those skilled in the art. The preferred embodiments of the present invention are described in detail as follows. However, in addition to these detailed descriptions, the present invention may also have other embodiments.

It shall be noted that the terminology used herein is for the purpose of describing particular embodiments only and is not intended to limit the exemplary embodiments of the present invention. As used herein, the singular forms are intended to include the plural forms as well, unless the context clearly indicates otherwise. It will be further understood that the terms "comprising" and/or "including" when used in this specification, specify the presence of stated features, wholes, steps, operations, elements, and/or components, but do not preclude the presence or addition of one or more other features, wholes, steps, operations, elements, components, and/or combinations thereof.

Now, exemplary embodiments according to the present invention will be described in more detail with reference to the accompanying drawings. However, these exemplary embodiments can be implemented in many different forms, and should not be interpreted as being limited to the embodiments set forth herein. It should be understood that these embodiments are provided to make the disclosure of the present invention thorough and complete, and to fully convey the idea of these exemplary embodiments to those of ordinary skill in the art.

The reaction device of the marine SCR system of the present invention will be described below in detail with reference to FIGS. 1 to 8.

With reference to FIGS. 1, 3, 4 and 5, the reaction device 100 comprises a conveying unit 110, a reaction chamber 120, at least one catalyst module 130 and an air homogenization chamber 140. Wherein, the conveying unit 110 includes an input pipeline 111 and an output pipeline 112 sleeved outside the input pipeline 111. One end of the reaction chamber 120 is connected to the conveying unit 110. The reaction chamber 120 includes an inner cylinder 121 and an outer cylinder 122 sleeved outside the inner cylinder 121. The inner cylinder 121 is in communication with the input pipeline 111, and the outer cylinder 122 is in communication with the output pipeline 112. The catalyst module 130 is arranged between the inner cylinder 121 and the outer cylinder 122. The air homogenization chamber 140 is connected to the other end of the reaction chamber 120 and in communication with both the inner cylinder 121 and the outer cylinder 122.

In the reaction device of the marine SCR system according to the present invention, the outer cylinder 122 is sleeved outside the inner cylinder 121, and the flue gas flowing from the inner cylinder 121 is turned by the air homogenization chamber 140 and then flows back into the outer cylinder 122. In this way, it is possible to not only substantially reduce the size of the reaction device 100 greatly and to improve the integration of the SCR system, but also to allow the flue gas to turn in the air homogenization chamber 140 and then flow back, so that the flue gas and a reducing agent can be fully mixed in the air homogenization chamber 140 to improve the catalytic reaction efficiency.

Figure 1:
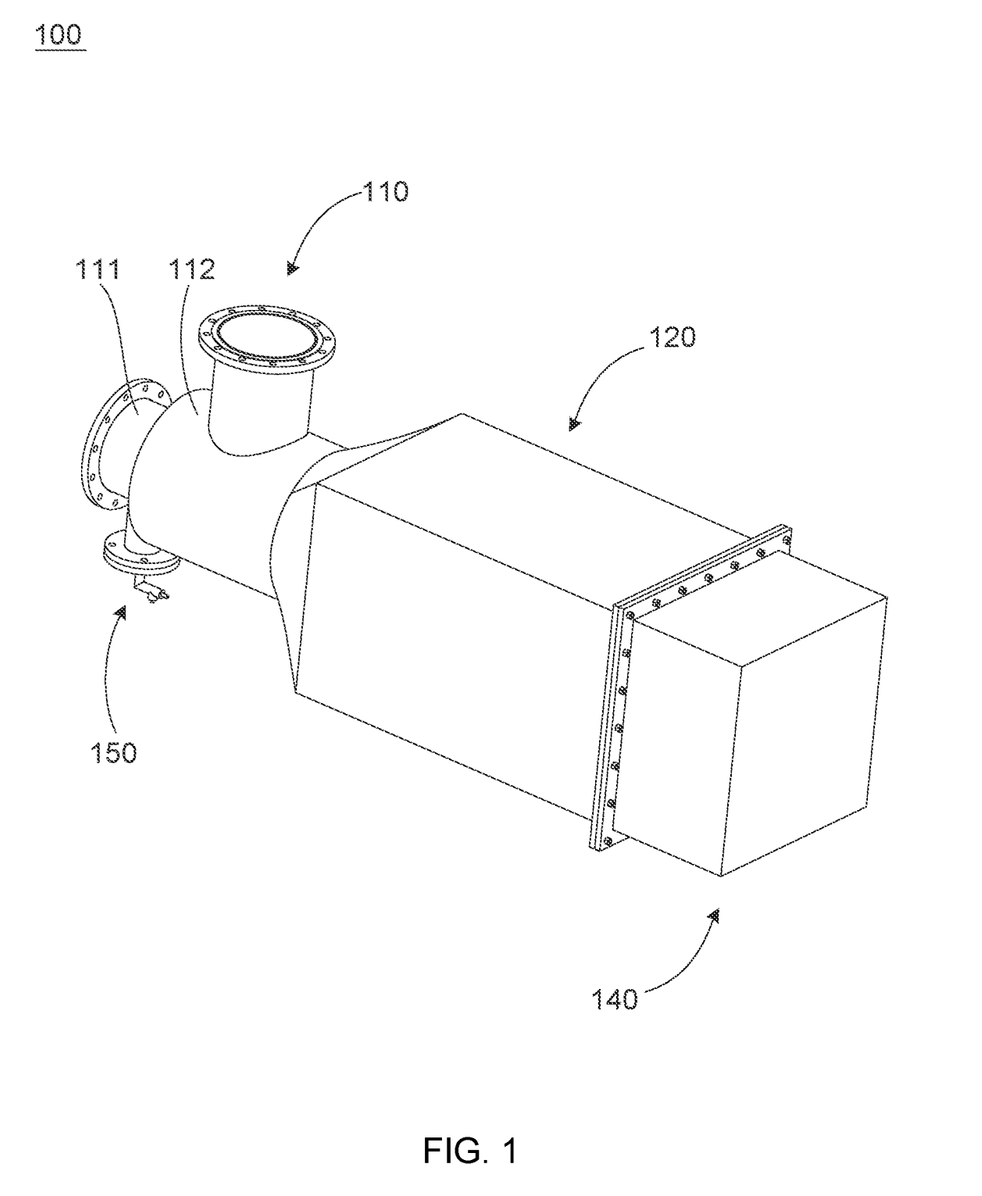
FIG. 1 is a perspective schematic view of a reaction device of a marine SCR system according to a preferred embodiment of the present invention.
Figure 2:
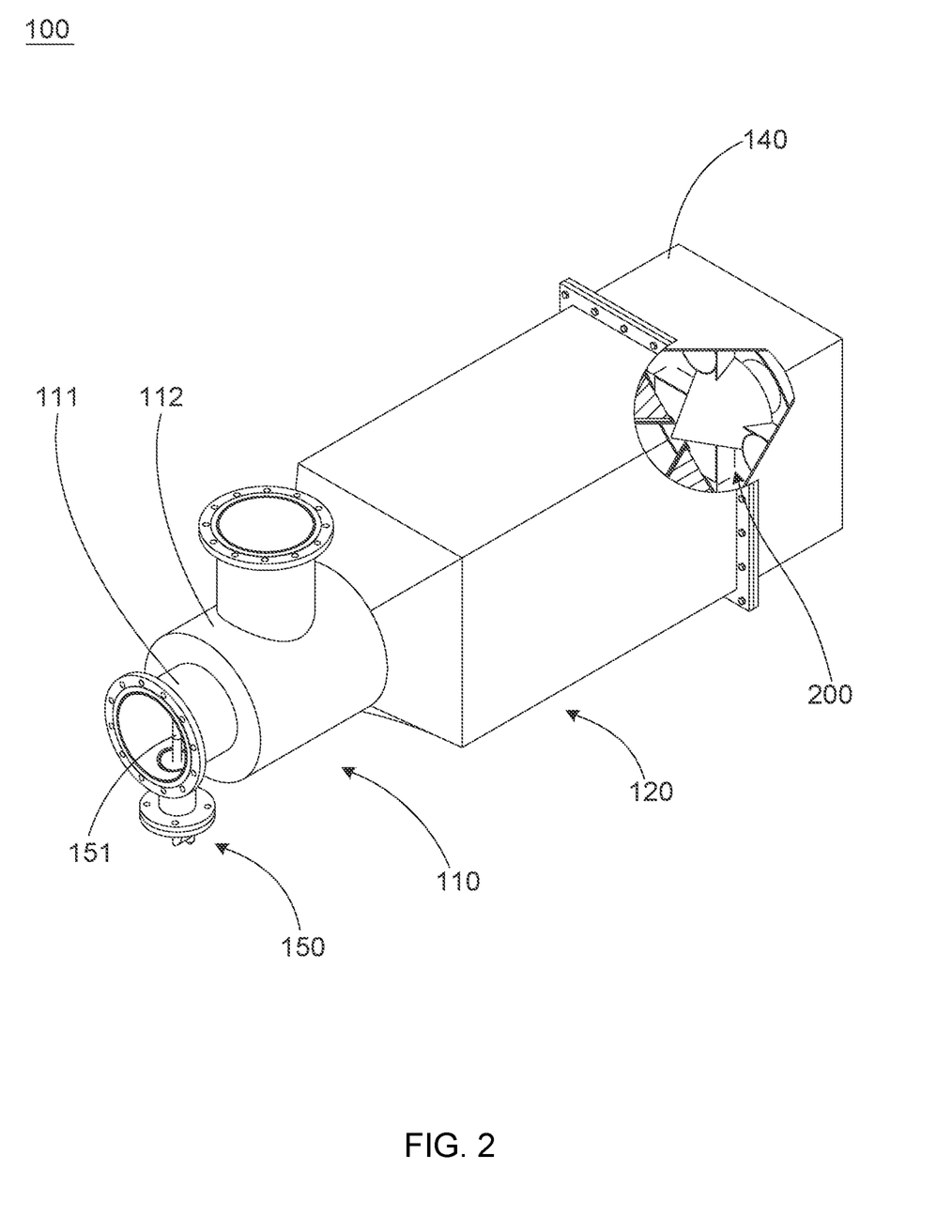
FIG. 2 is a perspective schematic view of the reaction device in FIG. 1, wherein a deflector is illustrated.
Figure 3:
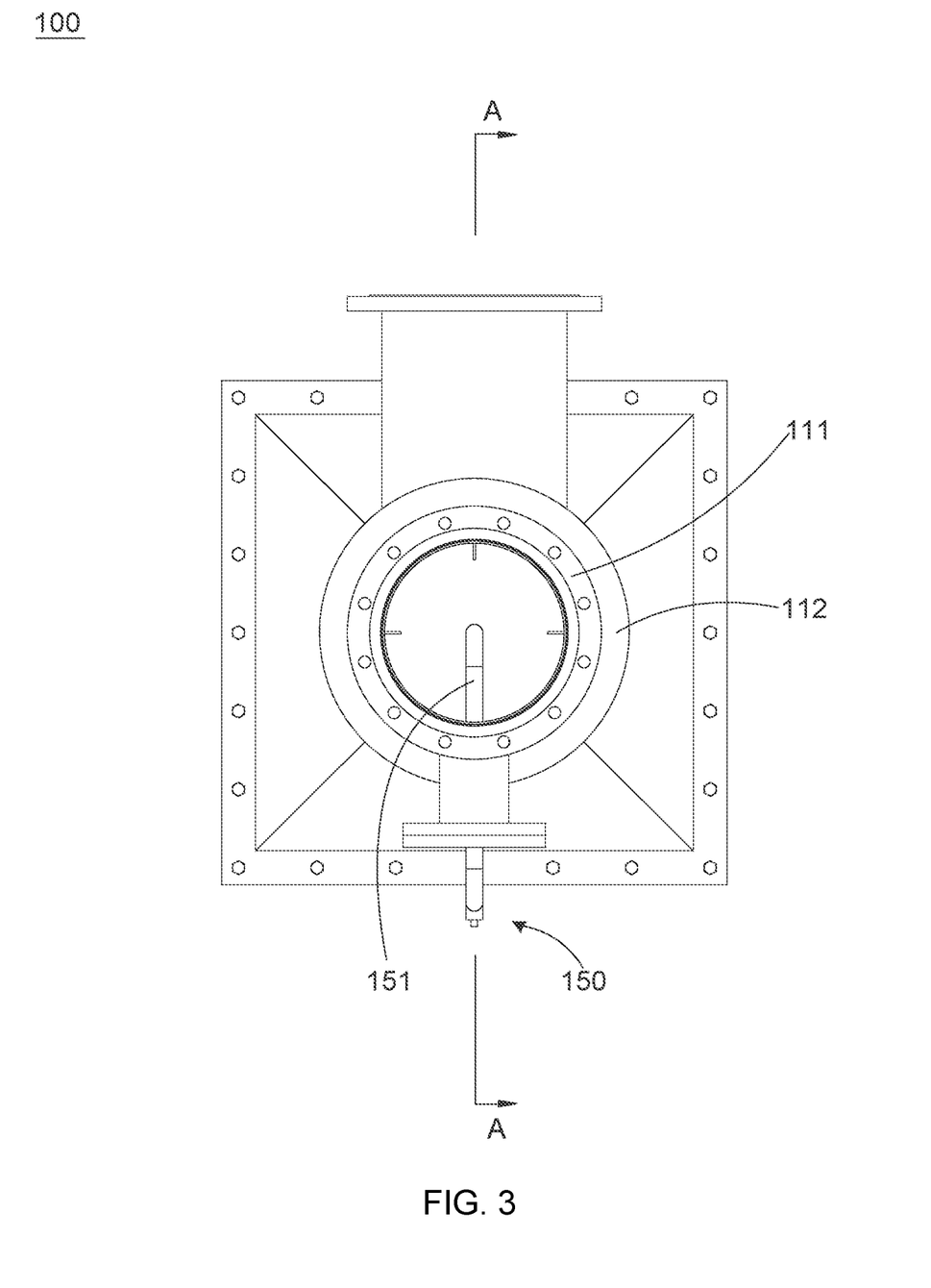
FIG. 3 is a front schematic view of the reaction device in FIG. 1.
Figure 4:
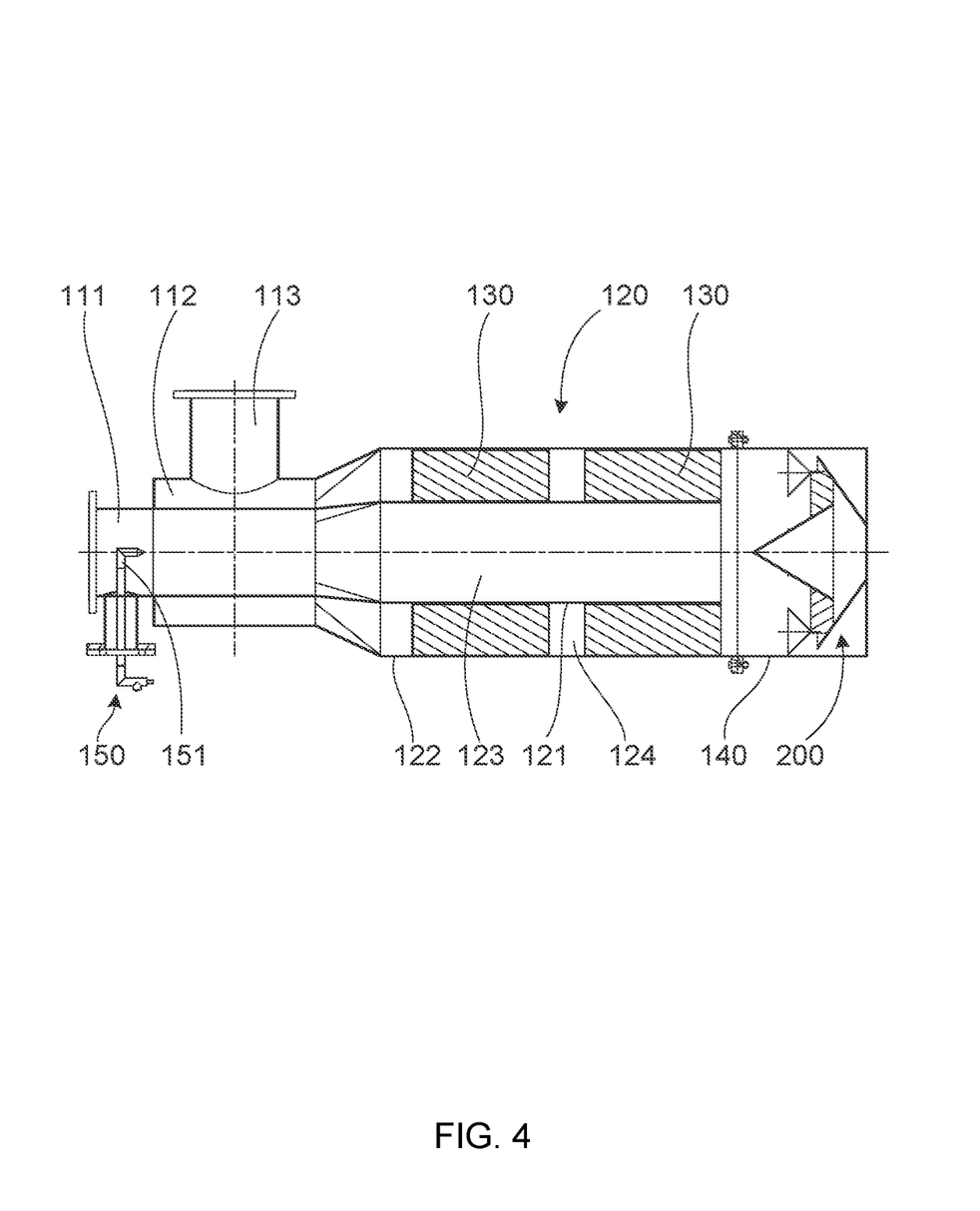
FIG. 4 is a cross-sectional schematic view taken along the line A-A in FIG. 3.
Figure 5:
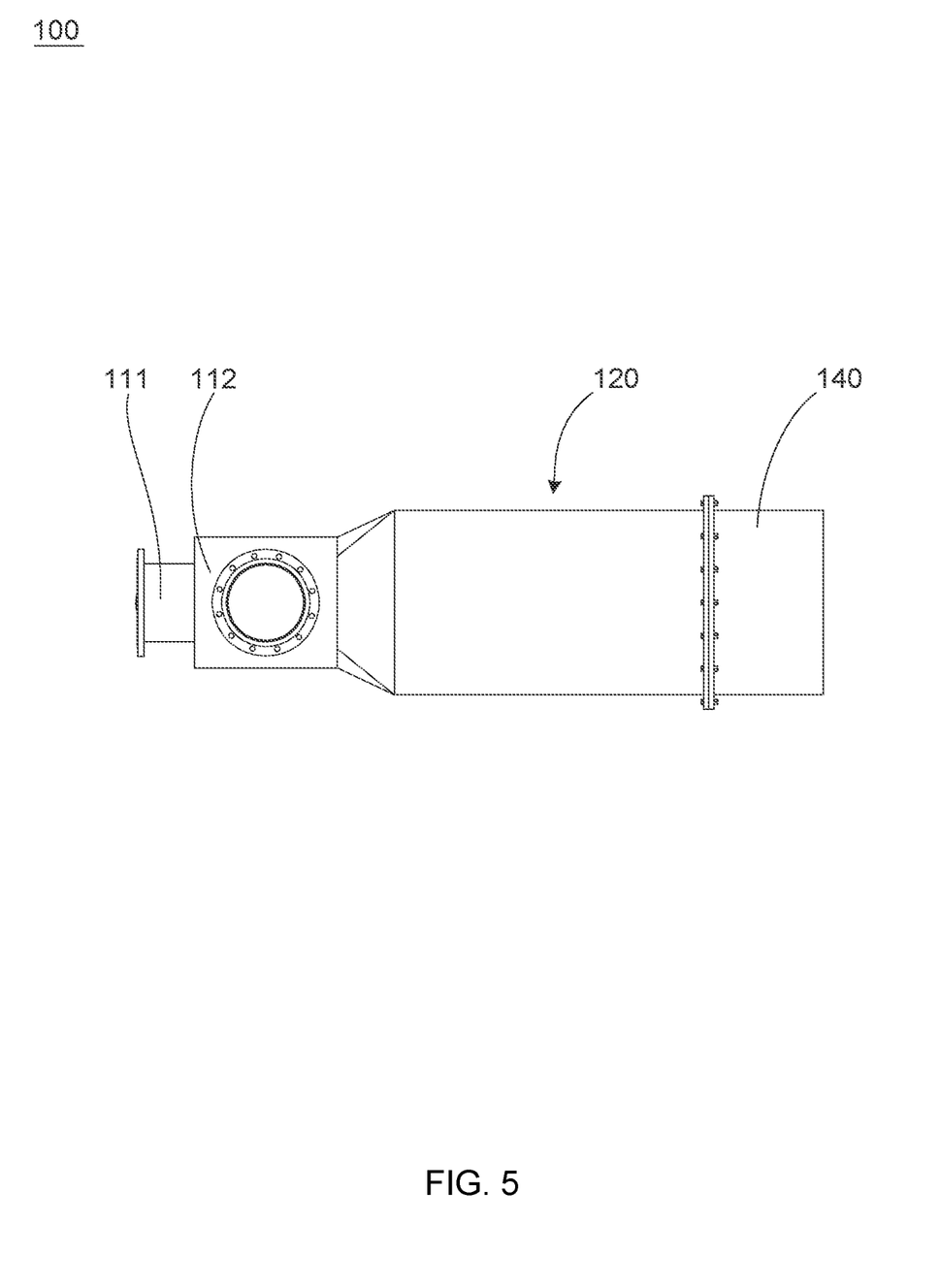
FIG. 5 is a top schematic view of the reaction device in FIG. 1.

Specifically, with reference to FIGS. 3 and 4, the inner cylinder 121 and the outer cylinder 122 of the reaction chamber 120 are both configured in a cuboid structure, which is generally similar to a square tube, and have the cross-sections in shape of a square or rectangle. The outer cylinder 122 is sleeved outside the inner cylinder 121, and respective ends thereof are flush. The space between the outer cylinder 122 and the inner cylinder 121 forms an outer flow channel 124, and the inner space of the inner cylinder 121 forms an inner flow channel 123. The inner cylinder 121 and the input pipeline 111 are connected by a Square to Round adapter, and the outer cylinder 122 and the output pipeline 112 are also connected by a Square to Round adapter.

The catalyst module 130 is disposed in the outer flow channel 124 between the outer cylinder 122 and the inner cylinder 121. The catalyst module 130 is generally configured as a hollow, square, honeycomb structure, and its shape is adapted to the shape of the outer flow channel 124 so that the inner cylinder 121 can support the catalyst module 130. The number of the catalyst modules 130 can be selected depending on the requirement for NOx removal efficiency, the pressure or flow rate of the flue gas, and the other factors. In the embodiment shown in FIG. 4, two catalyst modules 130 are provided in the outer flow channel 124. In the case of providing a plurality of catalyst modules 130, the side of the catalyst modules 130 facing the air homogenization chamber 140 is flush with the end face of the inner cylinder 121 closer to the air homogenization chamber 140, in order to reduce the resistance of the flue gas entering the apertures in the catalyst.

It would be understood that the catalyst module 130 may also be a honeycomb structure having other shapes, such as a hollow, round shape, a granular shape or a spherical shape, as long as it can be equipped into the outer flow channel 124.

Correspondingly, the inner cylinder 121 and the outer cylinder 122 are configured to have a square shape in order to hold the square catalyst module 130, and the cross-sectional shapes of the inner cylinder 121 and the outer cylinder 122 can be adapted to become a round or other shapes when the catalyst module 130 has a round or other shapes.

The reaction device 100 further comprises a spray assembly 150 that can be disposed at the conveying unit 110. In the illustrated embodiment, an injection pipeline can be provided to the input pipeline 111. The spray assembly 150 includes a sprayer 151 that extends into the input pipeline 111 via the injection pipeline, and the nozzle of the sprayer 151 is arranged in the direction towards the reaction chamber 120. As a result, the sprayer 151 injects the reducing agent along the conveying direction of the flue gas.

One end of the output pipeline 112 further away from the reaction chamber 120 is closed, and an exhaust pipeline 113 is provided on a side wall of the output pipeline 112 for exhausting flue gas after the reaction.

The air homogenization chamber 140 is detachably connected to the reaction chamber 120. Specifically, the air homogenization chamber 140 can be connected to the outer cylinder 122 by flanges or screws. Therefore, the air homogenization chamber 140 is removed when the catalyst module 130 needs to be replaced or cleaning is needed.

As such, the flue gas enters through the input pipeline 111 and enters the inner flow channel 123 together with urea. The inner cylinder 121 can act as a mixing pipeline. The mixture of the flue gas and urea from the inner flow channel 123 enters the air homogenization chamber 140, is diffused and turned in the air homogenization chamber 140 and then enters the outer flow channel 124, and is further mixed and thereby catalyzed by the catalyst module 130.

With the above arrangement, the mixing pipeline and the SCR reaction device 100 can be integrated, which greatly reduces the length and size of the reaction device 100, and facilitates the deployment on a ship.

In order to improve homogeneity of the flue gas at the inlet section of the catalyst, the reaction device 100 further comprises a deflector 200 arranged in the air homogenization chamber 140 for changing the flow direction of the flue gas, as shown in FIGS. 2, 4, 6, 7 and 8.

Figure 6:
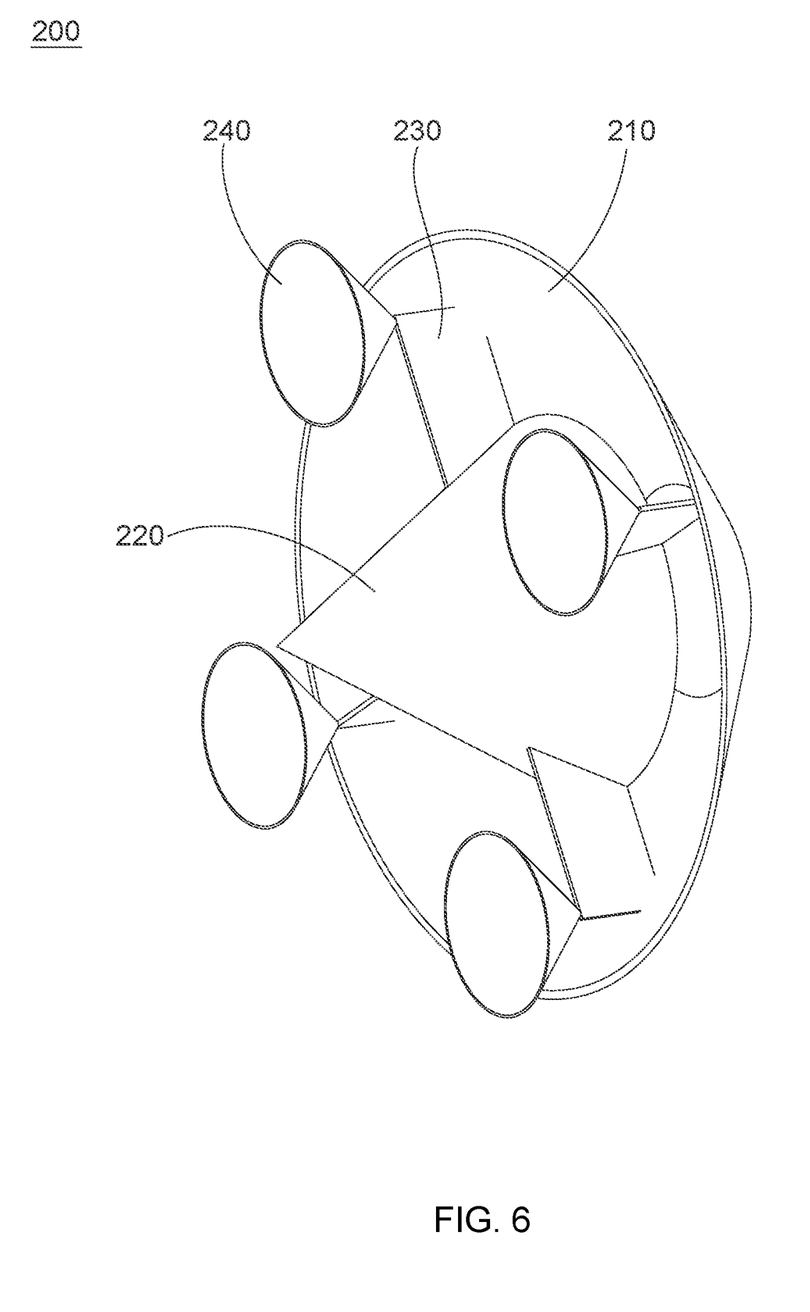
FIG. 6 is a perspective schematic view of the deflector of the reaction device of the marine SCR system according to a preferred embodiment of the present invention.
Figure 7:
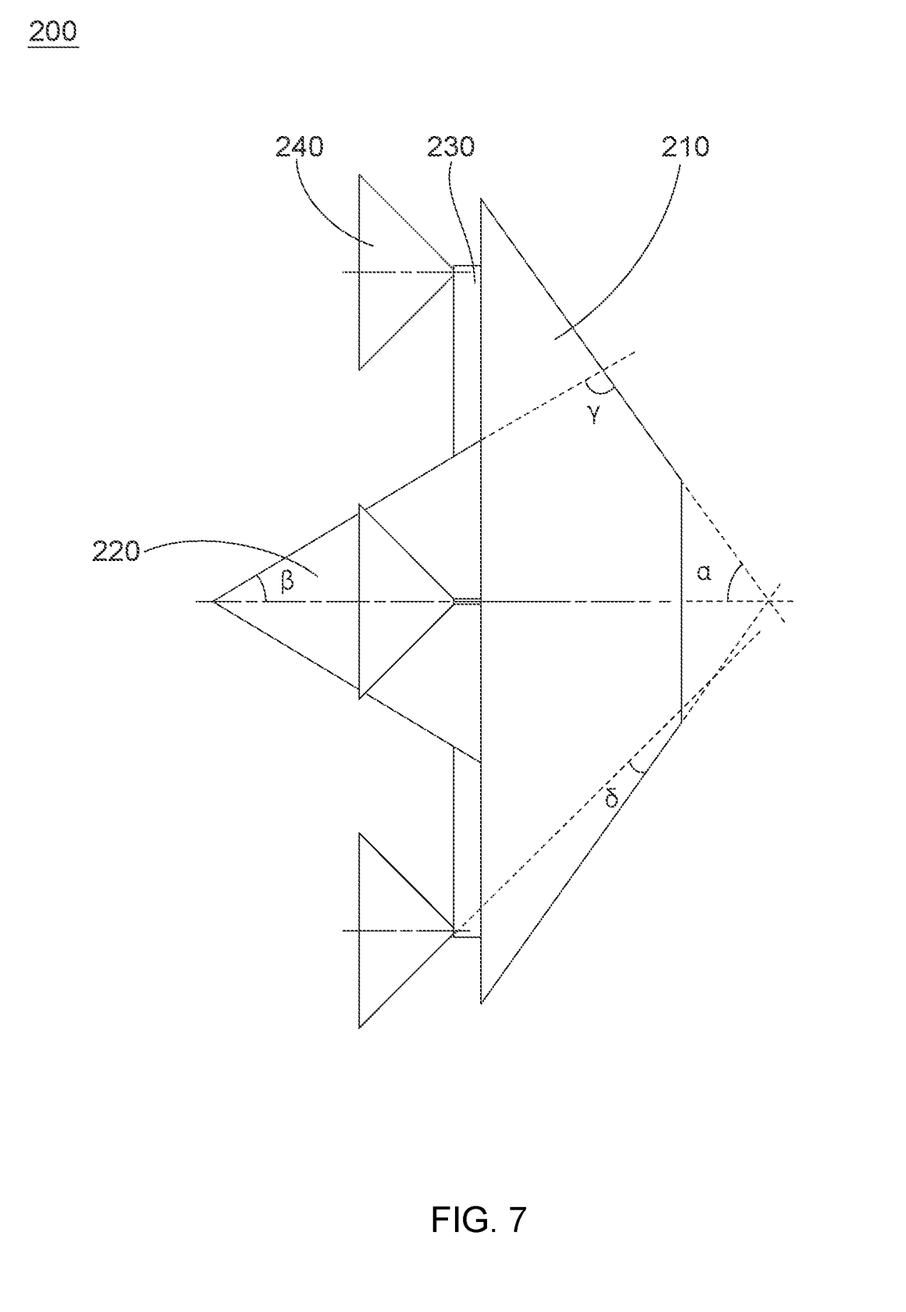
FIG. 7 is a side schematic view of the deflector in FIG. 6.
Figure 8:
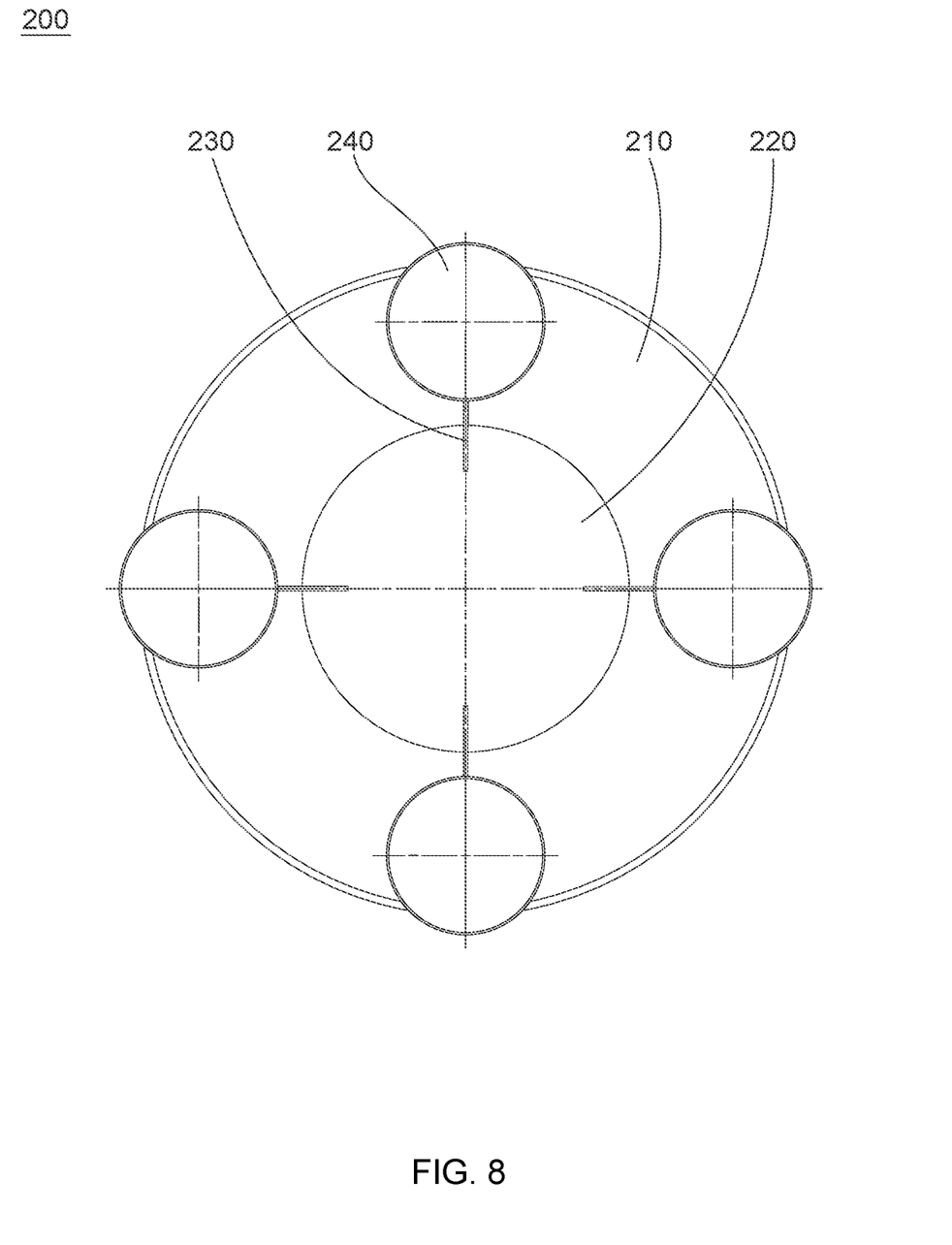
FIG. 8 is a front schematic view of the deflector in FIG. 6.

The deflector 200 comprises a backflow ring 210, a guide ring 220, at least one air homogenization plate 230 and at least one air homogenization ring 240.

The backflow ring 210 is configured in a truncated cylinder, and its top portion is connected to the surface of the wall of the air homogenization chamber 140 facing the reaction chamber 120. Preferably, the backflow ring 210 is configured in the shape of a truncated cone, and the top portion of the truncated cone is welded to the surface of the wall of the air homogenization chamber 140 facing the reaction chamber 120. The central axis of the backflow ring 210 can coincide with the central axis of the reaction chamber 120. In order to avoid any closed corner in the air homogenization chamber 140, the bottom of the backflow ring 210 is free of being tangent to the inner wall of the air homogenization chamber 140. That is, the bottom of the backflow ring 210 is spaced from the inner wall of the air homogenization chamber 140, and the gap therebetween is preferably greater than 30 mm. The included angle $\alpha$ (shown in FIG. 7) between the generatrix and the axis of the backflow ring 210 is about 15° to 70°.

The guide ring 220 is configured in a cone shape, preferably a circular cone shape. The cone tip of the guide ring 220 is arranged toward the reaction chamber 120, i.e., facing the inflow direction of the flue gas. The axis of the guide ring 220 can coincide with the axis of the backflow ring 210, so that the bottom opening of the guide ring 220 covers the top opening of the backflow ring 210, and the guide ring 220 is spaced apart from the backflow ring 210. The included angle $\beta$ (shown in FIG. 7) between the generatrix and the axis of the guide ring 220 is about 30° to 45°, and the included angle $\gamma$ (shown in FIG. 7) between the generatrix of the guide ring 220 and the generatrix of the backflow ring 210 is about 80° to 100°. Preferably, the generatrix of the guide ring 220 is substantially perpendicular to the generatrix of the backflow ring 210. The height of the guide ring 220 is preferably greater than 300 mm, and the cone tip of the guide ring 220 is separated from the outlet sectional plane of the inner cylinder 121 by at least 50 mm, up to 300 mm.

The air homogenization plate 230 is connected between the guide ring 220 and the backflow ring 210 in a horizontal direction and/or a vertical direction, and has a thickness of about 4 mm. In the illustrated embodiment, the deflector 200 includes four air homogenization plates 230, with two air homogenization plates 230 arranged vertically and two air homogenization plates 230 arranged horizontally. The width of the air homogenization plate 230 is not less than a half of the height of the backflow ring 210, and the long edge further away from the reaction chamber 120 is flush with the bottom of the guide ring 220. The two side edges of the air homogenization plate 230 are tangent to surfaces of the side wall of the guide ring 220 and the backflow ring 210, respectively.

The number of the air homogenization plates 230 and the number of the air homogenization rings 240 can be set depending on needs, and the number of the air homogenization rings 240 is preferably the same as the number of the air homogenization plates 230. In the illustrated embodiment, the deflector 200 includes four air homogenization rings 240.

The air homogenization ring 240 is configured to have a cone shape, and the top portion of the air homogenization ring 240 is arranged away from the reaction chamber 120 and is connected to the end of the air homogenization plate 230 that is further away from the guide ring 220. It can be understood that the cone tip of the air homogenization ring 240 is arranged facing the backflow direction of the flue gas. The included angle $\delta$ (shown in FIG. 7) between the generatrix of the air homogenization ring 240 and the generatrix of the backflow ring 210 does not exceed 10°, and the two are preferably arranged substantially in parallel. In order to prevent the formation of a closed corner, the distance between the outer circumference of the bottom of the cone of the air homogenization ring 240 and the inner wall of the air homogenization chamber 140 is at least 30 mm.

In an embodiment not shown, the number of the air homogenization ring 240 and the air homogenization plate 230 can be an even number such as 6, 8, or 10, and they are arranged along the circumferential direction of the backflow ring 210 and the guide ring 220 in an equally spaced manner to adapt to the cross sections of the inner cylinder 121 and the outer cylinder 122. When the cross sections of the inner cylinder 121 and the outer cylinder 122 are configured as a circle, the number of the air homogenization ring 240 and the air homogenization plate 230 can also be an odd number such as 3, 5, or 7, and they are arranged along the circumferential direction of the backflow ring 210 and the guide ring 220 in an equally spaced manner to adapt to the cross sections of the inner cylinder 121 and the outer cylinder 122.

In addition, the respective central axes of the guide ring 220, the backflow ring 210 and the air homogenization chamber 140 coincide, and the respective central axes of the guide ring 220, the backflow ring 210, the air homogenization chamber 140, the inner cylinder 121 and the outer cylinder 122 can also coincide.

Accordingly, with the air homogenization chamber 140 being disposed in the deflector 200 and the "wedge" principle for gas flow, in the high-speed flue gas entering the air homogenization chamber 140 from the inner flow channel 123, the central portion of the high-speed flue gas has enough diffusion radius to homogenously diffuse to the surroundings under the action of "wedge" of the cone-shaped guide ring 220. The diffused gas is turned by the obstruction and guidance of the wall surface of the tapered backflow ring 210, and then further distributed and diffused through the air homogenization plate 230 and the air homogenization ring 240, such that part of "sub-high-speed" airflow in the center of a sectional plane of the air homogenization chamber 140 is homogenously guided to four corners. This leads to the flue gas in the catalyst inlet section tending to be homogenously distributed and effectively mixed, which can efficiently improve the NOx removal efficiency of the catalyst.

Unless defined otherwise, the technical and scientific terms used herein have the same meaning as commonly understood by one of ordinary skill in the art to which this invention belongs. The terms used herein are only for describing specific implementation purposes, and are not intended to limit the present invention. A feature described in one embodiment herein can be applied to another embodiment alone or in combination with other features, unless the feature is not applicable in the other embodiment or otherwise stated.

The present invention has been described through the above-mentioned embodiments, but it should be understood that the above-mentioned embodiments are only for the purpose of illustration and description, and are not intended to limit the present invention to the scope of the described embodiments. Furthermore, those skilled in the art can understand that this invention is not limited to the above-mentioned embodiments, and more variations and modifications can be made in light of the teachings of the present invention. These variations and modifications all fall within the scope claimed by the present invention as defined in the appended claims and their equivalents.

What is claimed is:

1. A reaction device of a marine SCR system, comprising:
    a conveying unit including an input pipeline and an output pipeline sleeved outside the input pipeline;
    a reaction chamber, one end of the reaction chamber is connected to the conveying unit, the reaction chamber including an inner cylinder and an outer cylinder sleeved outside the inner cylinder, and the inner cylinder being in communication with the input pipeline and the outer cylinder being in communication with the output pipeline;
    at least one catalyst module arranged between the inner cylinder and the outer cylinder;
    an air homogenization chamber connected to the other end of the reaction chamber and being in communication with both the inner cylinder and the outer cylinder; and
    a deflector arranged in the air homogenization chamber for changing a flow direction of flue gas, the deflector comprising:
    a backflow ring configured in the shape of a truncated cone, and a top portion of the backflow ring being connected to a wall surface of the air homogenization chamber facing the reaction chamber; and
    a guide ring configured in a cone shape, a cone tip of the guide ring being arranged towards the reaction chamber, a bottom opening of the guide ring covering a top opening of the backflow ring, and the guide ring spaced apart from the backflow ring.

2. The reaction device according to claim 1, wherein the reaction device further comprises a spray assembly including a sprayer that extends into the input pipeline, wherein a nozzle of the sprayer is oriented towards the reaction chamber.

3. The reaction device according to claim 1, wherein an end of the output pipeline that is further away from the reaction chamber is closed, and an exhaust pipeline is provided on a side wall of the output pipeline for exhausting flue gas after reaction.

4. The reaction device according to claim 1, wherein cross-sections of the inner cylinder and the outer cylinder are square-shaped.

5. The reaction device according to claim 1, wherein a side of one of the catalyst modules facing the air homogenization chamber is flush with an end face of the inner cylinder closer to the air homogenization chamber.

6. The reaction device according to claim 1, wherein the deflector further comprises:
    at least one air homogenization plate connected between the guide ring and the backflow ring in a horizontal direction and/or a vertical direction.

7. The reaction device according to claim 6, wherein the deflector further comprises at least one air homogenization ring configured in a cone shape, and a top portion of the air homogenization ring is arranged facing away from the reaction chamber and connected to an end of the air homogenization plate further away from the guide ring.

8. The reaction device according to claim 1, wherein respective central axes of the guide ring, the backflow ring and the air homogenization chamber coincide.

9. The reaction device according to claim 1, wherein an included angle between the generatrix and the axis of the backflow ring is about 15° to 70°.

10. The reaction device according to claim 1, wherein an included angle between the generatrix and the axis of the guide ring is about 30° to 45°, and an included angle between the generatrix of the guide ring and the generatrix of the backflow ring is about 80° to 100°.

11. The reaction device according to claim 1, wherein the generatrix of the guide ring is substantially perpendicular to the generatrix of the backflow ring.

12. The reaction device according to claim 10, wherein the generatrix of the guide ring is substantially perpendicular to the generatrix of the backflow ring.

13. The reaction device according to claim 1, wherein the bottom of the backflow ring is spaced from an inner wall of the air homogenization chamber.

14. The reaction device according to claim 7, wherein an included angle between the generatrix of the air homogenization ring and the generatrix of the backflow ring does not exceed 10°.

15. The reaction device according to claim 7, wherein the deflector comprises a plurality of air homogenization rings that are arranged along the circumferential direction of the backflow ring and the guide ring in an equally spaced manner.

* * * * *